March 3, 1931.  C. W. RUNDLETT  1,795,045
AUTOMOBILE HEATING SYSTEM AND APPARATUS
Filed Nov. 16, 1927   2 Sheets-Sheet 1
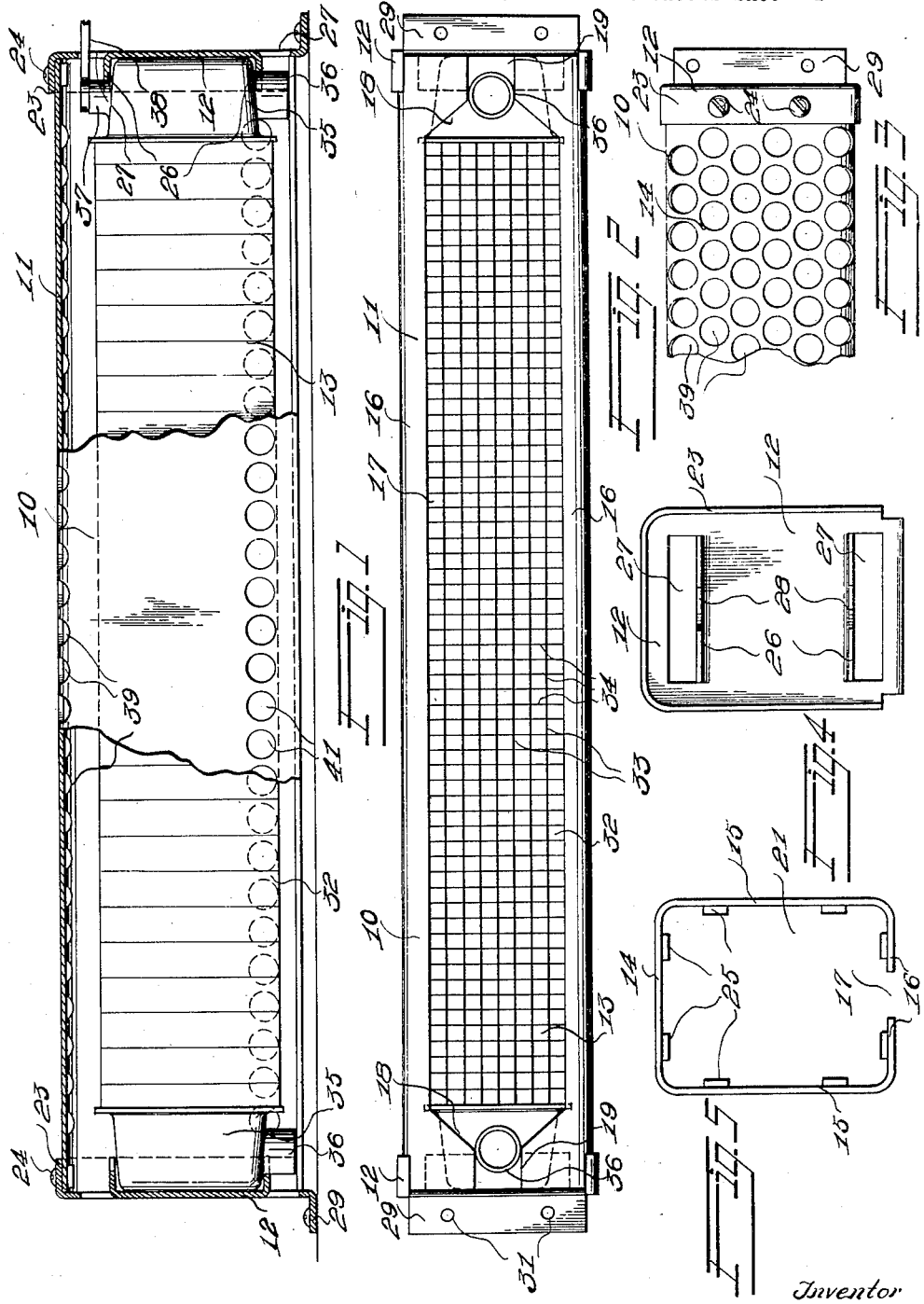
Inventor
Carl W. Rundlett
William A. Strauch
Attorney March 3, 1931.  C. W. RUNDLETT  1,795,045
AUTOMOBILE HEATING SYSTEM AND APPARATUS
Filed Nov. 16, 1927  2 Sheets-Sheet 2
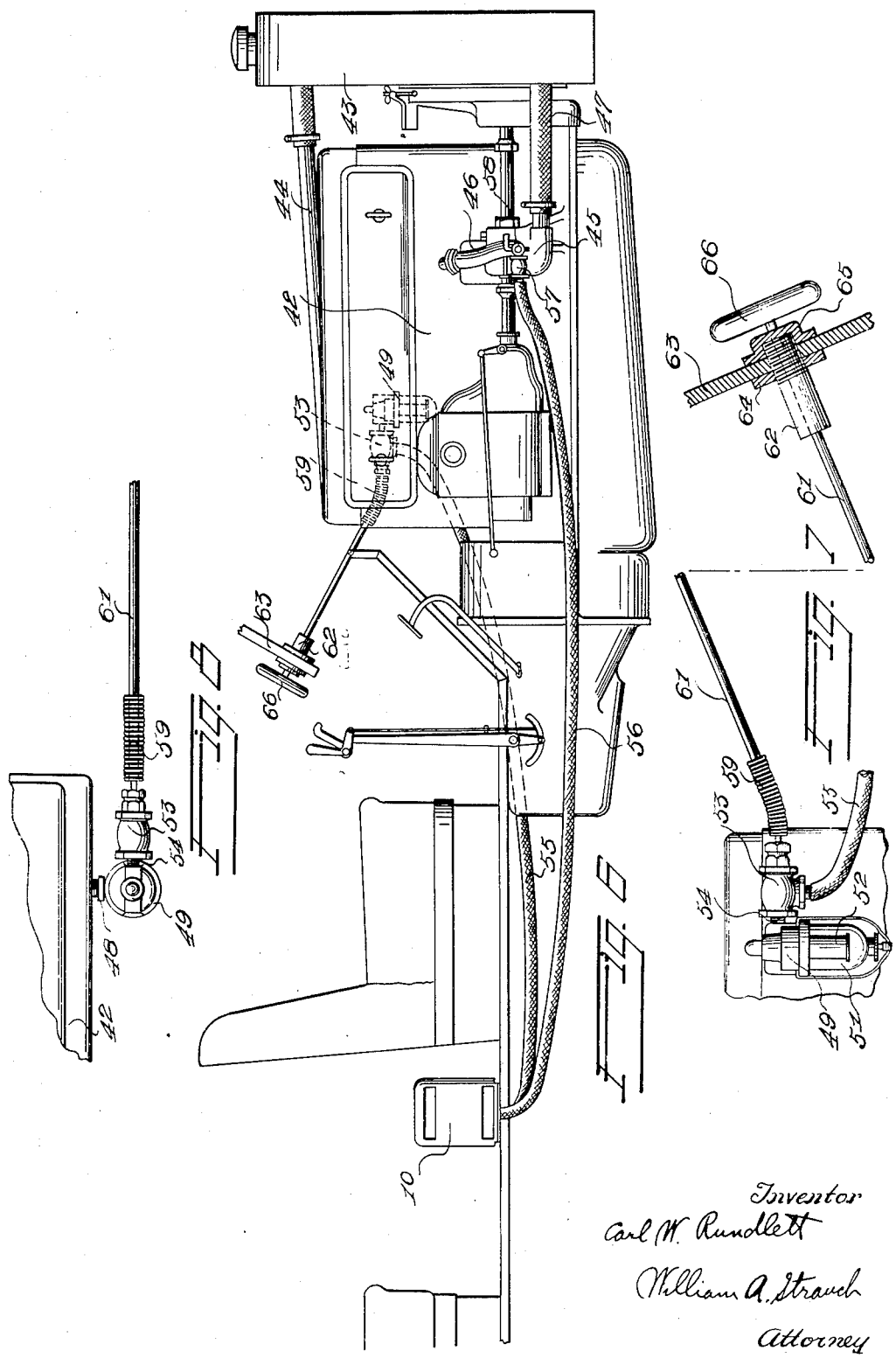
Inventor
Carl W. Rundlett
William A. Strauch
Attorney Patented Mar. 3, 1931

1,795,045

UNITED STATES PATENT OFFICE

CARL W. RUNDLETT, OF JACKSON HEIGHTS, NEW YORK, ASSIGNOR TO MOT-ACS, INCORPORATED, OF NEW YORK, N. Y., A CORPORATION OF DELAWARE

AUTOMOBILE HEATING SYSTEM AND APPARATUS

Application filed November 16, 1927. Serial No. 233,630.

This invention relates to an improved automobile heating system utilizing the water of the engine cooling system and to a novel heater for use in such a system.

It has been found heretofore that automobile heaters designed to utilize the water of the engine cooling system must be made of relatively small water capacity compared to the capacity of the cooling system, in order that the effective operation of the cooling system may not be seriously interfered with. Accordingly, only a relatively small quantity of water is available to heat the car and it has heretofore been proposed to secure a maximum radiation from the minimum quantity of water available by utilizing radiating elements that conduct the available water therethrough in spaced thin sheets and to so construct the radiating element that the cool air within the car body which normally settles to the floor thereof, may pass completely around the thin streams of water circulating through the heater. Such systems accordingly must embody a plurality of relatively small passages and it becomes a matter of importance to prevent the collection of impurities that would clog the relatively small heater passages.

By this invention it is proposed to filter the water before it passes to the heater to the end that by no possibility can the small heater passages be blocked by dirt or impurities that may have accumulated in the engine cooling system. As the water that flows to the heater is by-passed from the cooling system it is entirely practical to embody a filter in the by-pass since its location in this position does not interfere with the free operation of the cooling system. At the same time, a filter so disposed collects the dirt and impurities and prevents their return with the water that has been passed through the heater to the engine cooling system. In this way the circulatory system of the engine is gradually cleaned and maintained in this condition. It will be observed accordingly, that the filter just referred to not only insures the satisfactory operation of the heater but that it, at the same time contributes to the effective operation of the engine cooling system by keeping it relatively clean at all times.

A primary object of this invention, accordingly, is the provision of a filtering means in an automobile heating system that utilizes the water of the engine cooling system as the heating medium and in the disposition of said filtering means in such relation with respect to the engine cooling system that its presence in a subordinate part of that system does not interfere with the free circulation of water therein.

A further object of this invention is the provision of an extremely simple heater adapted to utilize as a heating medium hot water from the cooling system of an automobile and which is of such construction as to be thoroughly efficient with the utilization of only a small volume of water of the engine cooling system, thus in no way impairing the efficiency of said cooling system or affecting the operation of the motor.

A further object of this invention is the provision of a simple and practical heater adapted to utilize as a heating medium a relatively small volume of hot water diverted from the cooling system of an automobile and which is of such construction that the hot water circulates therethrough in spaced thin sheets and in which the air within the car is caused to flow naturally between said thin sheets whereby the heat of the water is efficiently and economically transferred to said cool air.

A still further object of this invention is the provision of a heater for automobiles which consists of few parts which are simple in construction, cheap to manufacture and which are adapted to be conveniently and expeditiously assembled, and dis-assembled.

A still further object of this invention is the provision of a heating system for automobiles in which the water is by-passed under ready control of the operator of the automobile from the motor jacket and caused to flow thru a heater located in the body of the automobile.

A still further object of the invention is to provide an automobile heating system in which the heater is of a length corresponding approximately to the width of the engine and in which the connections between said heater and the engine cooling system are made at opposite sides of the engine whereby a minimum length of insulated conducting tubing may be used thus keeping the capacity of the system at a minimum and contributing greatly to the simplicity of installation of the heating system in stock cars.

A still further object of this invention is the provision of a heating system for automobiles in which a small volume of water is by-passed from the motor jacket at one side of the engine thru a heater located in the body of the automobile and thence back to the cooling system of the automobile at the other side of the engine adjacent the suction side of the water pump.

A still further object of this invention is the provision of a valve and a dash control for operating said valve to regulate the volume of water by-passed from the motor jacket to the heater.

With these objects in view as well as others as may become apparent from the following specification reference will be had to the accompanying drawings forming a part thereof and in which:

Figure 1 is a view partly in side elevation and partly in central longitudinal section of the improved heater.

Figure 2 is a bottom plan view of the structure disclosed in Figure 1.

Figure 3 is a top plan view of one end of the heater.

Figure 4 is an inside elevation of one of the removable end plates.

Figure 5 is an end view of the heater casing.

Figure 6 is a more or less diagrammatic view illustrating the installation of the heater in an automobile.

Figure 7 is a broken side elevational view of the left side of the motor block showing the connection of the heater by-pass and regulating valve therewith, and Figure 8 is a top plan view of the structure disclosed in Figure 7.

Referring to the drawings by reference characters in which like characters designate like parts, 10 designates a preferred form of heater which in its construction comprises a casing 11, end plates 12 and a heating element 13.

The casing 11 is an elongated structure substantially rectangular in cross section and is formed of thin sheet metal bent to provide a top 14 and sides 15, the metal being bent inwardly at the bottom of the casing in the form of flanges 16 providing an opening 17 therebetween of a width substantially equal to the width of the heating element 13, the flanges 16 adjacent the ends of the casing 11 being further inwardly bent providing therebetween an outwardly converging opening 18 merging into a parallel sided opening 19 adjacent each end of the casing 11.

The ends of the casing are open as indicated at 21 which are adapted to be closed by means of the detachable end plates 12.

Each end plate 12 is provided with a flange 23 co-extensive with the top and sides thereof which flange is adapted to embrace the external surface of the casing 11 adjacent the end thereof, the flange 23 being removably secured to the casing 11 by means of bolts 24 passing thru apertures in the flange and engaging nuts 25 which are welded to the inner surface of the casing 11 or the casing walls may be tapped to receive the bolts.

Each end plate 12 is further provided with a pair of inwardly extending heater element supports 26 which are formed by bending in portions of the metal forming the end plate thereby providing an opening 27 adjacent each support 26. Each support 26 is provided with an arcuate recess 28 for a purpose presently to appear.

Each end plate 12 is further provided with a foot member 29 which when the end plates 12 are assembled on the casing 11 extend below the bottom of the casing 11 thereby supporting the bottom of the casing above the floor to which the foot members 29 are secured by means of fastening elements extended thru perforations 31 therein.

The heating element 13 comprises an elongated cellular structure 32 which as in usual practice is formed of longitudinally extending vertically disposed thin water conducting members 33 and transversely extending vertically disposed webs 34 integrally connecting and spacing the members 33. The elongated cellular structure 32 at each end thereof and the thin channels in members 33 are in communication with headers 35. Each header is provided on the bottom thereof, with an internally threaded nozzle 36 adapted for connection therewith of water conducting members hereinafter described.

One of the headers 35, preferably the one at the inlet end of the heater is provided with a valve 37 adapted to have connected therewith an operating lever 38 which extends thru the adjacent opening 27 to be readily accessible to a passenger within the automobile in which the heater is installed.

It will be noted upon reference to Figures 1 and 2 that the nozzles 36 seat within the recesses 28 adjacent the bottom of the casing 11 and the valve 37 seats within one of the upper recesses 28, and the headers 35 each project into the space between the supports 26 on each end plate 12 and into contact with the end plate thus positioning the heating element 13 accurately within the casing 11 and holding it securely therein.

By providing recesses 28 at each end of the casing the heating element 13 can be inserted within the casing with the valve 37 at either end thereof thus facilitating the assembling operation.

Hot water is adapted to enter the heating element 13 at one end thereof thru the nozzle 36 and header 35 and pass thru the heating element in the form of thin sheets in the conducting members 33 and thence discharged from the heating element thru the nozzle 36 and header 35 at the opposite end.

In order to provide for a circulation of air thru the heater the casing 11 as before stated is elevated above the floor level by means of the foot members 29 to admit the cool air into the bottom of the heating element 13 which cool air passes thru the cells of the cellular structure 32 and to provide for the discharge of the resulting heated air the casing 11 in the top 14 thereof is provided with a multiplicity of relatively closely spaced holes 39. The casing may also be provided with a row of holes 41 on each side thereof adjacent the bottom of the heating element to further aid in the circulation of the air. The openings 27 in the end plates 22 also aid the circulation of air thru the heater. In order to obtain the most efficient circulation of air thru the heater, it is very important, in fact a necessity that the heater be elevated above the floor level as disclosed for the reason that in the natural circulation of air the cooler air seeks the lowest possible point which in order to make the heater most effective should enter the heater at the bottom thereof and consequently come into contact with the full area of the heated walls of the heating element.

In the utilization of a heater of the character disclosed, it is desirable that the relatively small water circulating passages be kept clear so as to secure the maximum efficiency from the relatively small amount of water passing thru the heater and to secure the best results from the water by-passed from the water circulating system. An example of such an installation is disclosed in Figure 6 in which 42 designates an internal combustion engine comprising cylinders, pistons, and water jacket surrounding the cylinders, a construction that is well known to those skilled in this art. Adjacent the engine 42 is the cooling radiator 43 which at the top thereof is in comunication with the top of the water jacket by means of the connection 44. The circulation of the water in the cooling system is completed by means of a pump 45 which is in communication with the water jacket thru connection 46 and with the bottom of the radiator 43 thru the connection 47.

The heater 10 is adapted to be installed within the body of an automobile either in advance of the front seat or between the front and rear seats resting on the floor of the body. It is illustrated between the seats in the drawing.

In order to provide for a positive and rapid circulation of water thru the heater 10 and for convenience in installation it is preferable to divert the water from the water jacket at as high a point towards the top of the cylinder head as possible so that the water may be obtained at its maximum temperature and return the water thru the suction side of the pump 45, at the opposite side of the engine.

In order to prevent clogging of the heater passages, a strainer or filter is interposed in the heater by-pass connections and preferably in the supply line in order to remove dirt or impurities from the heating system and incidentally from the engine cooling system.

As shown in Figures 6, 7 and 8 the engine block 42 at the left rear side thereof is tapped between adjacent cylinders and provided with a short nipple 48. Threadedly engaged with the projecting end of the nipple 48 is a strainer or filter 49 which essentially comprises a bowl 51 into which the water passes and in the bottom of which the dirt settles, and a filtering element 52 consisting of alternating thin brass washers and spacers between which the water passes in its upward course thru the bowl. The filter 49 is connected to a valve 53 thru a threaded nipple 54. Connected with the valve 53 at one end thereof is a heat insulated conduit 55 in the form of a rubber hose, which at its opposite end is connected to the inlet end of the heater 10 thru the nozzle 36. While a specific form of filter is described it is to be understood that filters of other forms could effectively be employed.

Connected to the nozzle 36 of the discharge end of the heater 10 is a heat insulating conduit 56 which at its opposite end is connected to a valve 57 which in turn is in communication with the suction side of the pump 45.

The connection to the pump is preferably made by removing the drain cock 58 connecting one end of a T to the pump by means of a closed nipple, connecting the drain cock to the other end of the T and connecting the conduit 56 to a closed nipple screwed into the side of the T.

In order to conveniently adjust the valve 53, a heavy coil spring 59 is connected to the handle thereof. Connected to said spring is a rod 61 which extends thru a barrel member 62 located in the dash 63 and which is retained in position by means of lock nuts 64 and 65 engaging the opposite sides of the dash 63. The rod 61 extends thru the lock nut 65 and on the end thereof is provided with a suitable operating handle 66.

In operation a relatively small volume of hot water is by-passed from the water jacket of the motor 42 due to the small capacity of the connections and heater. Said water flows thru the filter 49, valve 53 and the relatively small heat insulated conduit 55 to the inlet end of the heater 10. The water passes thru the thin conducting members 33 in form of thin wide sheets exposing a maximum area to the currents of cold air entering the bottom of the heater and passing between the thin sheets of water resulting in a rapid exchange of heat from the water to the currents of air circulating thru the heater.

The water then robbed of a relatively small percentage of its heat is drawn from the discharge end of the heater 10 by means of the suction created in the pump 45 and is returned to the water jacket of the engine 42.

By connecting the return conduit to the suction side of the pump the water is caused to circulate rapidly thru the heater and due to the construction of the heater whereby a small percentage of the heat of the diverted water is transferred to the currents of cool air, naturally circulating therethru without appreciable waste.

Accordingly it is necessary to divert only a small percentage, less than 20% of the water in the circulating system. Such small diversion does not affect the efficiency of the cooling system.

By means of the valve actuating means connected with the dash the valve can be conveniently and expeditiously operated and due to the flexible spring connection the rod 61 can be connected with the dash even should the tapped connection be positioned other than precisely as disclosed.

While I have disclosed certain specific embodiments of my invention, it is to be understood that I am not limited thereto but am at liberty to make such changes or alterations as fairly fall within the scope and range of equivalency of the appended claims.

What I claim and desire to secure by United States Letters Patent, is:—

1. A heater designed to be supported above the floor of an automobile body comprising a casing provided with a multiplicity of holes in the top thereof and an elongated opening in the bottom thereof, a cellular heating element disposed within said casing in alinement with said elongated opening whereby the cool air to be heated enters the bottom of said heating element thru said opening and flows upwardly thru said cellular element and out thru said holes.

2. In a heater, an open ended casing provided with a series of nuts welded thereto adjacent each end thereof detachable end plates adapted to close the ends of said casing, each end plate provided with a flange having perforations therein adapted to register with said nuts, said alined perforations and nuts adapted to receive securing elements to detachably secure the end plates to said casing.

3. A heater comprising a casing, detachable plates secured to the ends of said casing, said plates each provided with a pair of spaced integral, inwardly extending recessed supporting members, a heating element comprising a cellular body portion and end headers, said headers provided with nozzles one of said headers provided with a valve, said heating element adapted to be removably supported within said casing with said headers engaged between said supporting members and said nozzles and valve engaged within corresponding ones of said recesses.

4. An automobile heater comprising a radiating member consisting of headers and means connecting said headers to conduct the water from one header to another in a plurality of thin sheets, a supporting casing for said radiating element consisting of end and side members and a top member provided with perforations to permit the circulation of air therethrough, said radiating element being supported between shelves projecting toward each other from said end members.

5. An automobile heater comprising a radiating member consisting of headers and means connecting said headers to conduct the water from one header to another in a plurality of thin spaced sheets and webs to radiate the heat laterally from said means, a supporting casing for said radiating element consisting of end and side members, and a top member provided with perforations to permit the circulation of air therethrough, said radiating element being supported between shelves projecting toward each other from said end members.

6. An automobile radiator comprising a casing consisting of a sheet metal body open at one side and both ends, a portion of said body being perforated for the circulation of air from said open side through said body, end members telescoped over the opposite ends of said casing and secured thereto, said end members provided with inwardly projecting supports and supporting legs arranged to space said body above the floor of an automobile, a heat radiating member arranged within said body and supported on the suuporting members of said ends, said heat radiating member comprising headers disposed adjacent said ends, and means connecting said headers and arranged to conduct the water in relatively thin sheets with the largest dimension extending substantially normal to the top of said body and from one header to the other and including heat radiating webs arranged between said means, the water capacity of said headers and means restricted relative to the capacity of the system with which it is to be used.

In testimony whereof I affix my signature.

CARL W. RUNDLETT.